United States Patent [19]
Kim et al.

[11] Patent Number: 5,862,263
[45] Date of Patent: Jan. 19, 1999

[54] FRACTAL IMAGE COMPRESSION DEVICE AND METHOD USING PERCEPTUAL DISTORTION MEASUREMENT

[75] Inventors: Jae-Ho Kim; Yong-Ho Moon, both of Busan; Dong-Seek Park, Daegu, all of Rep. of Korea

[73] Assignee: SamSung Electronics Co., Ltd., Suwon, Rep. of Korea

[21] Appl. No.: 629,651

[22] Filed: Apr. 9, 1996

[30] Foreign Application Priority Data

Apr. 13, 1995 [KR] Rep. of Korea .................... 1995-8690

[51] Int. Cl.$^6$ ....................................................... G06K 9/36
[52] U.S. Cl. .......................... 382/249; 382/232; 358/433; 358/426
[58] Field of Search .................................. 382/249, 235, 382/250, 233, 248, 232, 299, 300; 358/433, 432, 426; 345/441, 436

[56] References Cited

U.S. PATENT DOCUMENTS

| | | | |
|---|---|---|---|
| 4,694,407 | 9/1987 | Ogden | 345/441 |
| 4,789,933 | 12/1988 | Chen et al. | 382/128 |
| 4,941,193 | 7/1990 | Barnsley et al. | 382/249 |
| 4,953,214 | 8/1990 | Takeguchi et al. | 704/230 |
| 5,065,447 | 11/1991 | Barnsley et al. | 382/249 |
| 5,148,497 | 9/1992 | Pentland et al. | 382/249 |
| 5,299,019 | 3/1994 | Pack et al. | 358/433 |
| 5,347,600 | 9/1994 | Barnsley et al. | 382/249 |
| 5,384,867 | 1/1995 | Barnsley et al. | 382/249 |
| 5,416,856 | 5/1995 | Jacobs et al. | 382/249 |
| 5,430,812 | 7/1995 | Barnsley et al. | 382/235 |
| 5,442,459 | 8/1995 | Gahang | 358/433 |
| 5,497,435 | 3/1996 | Berger | 382/249 |
| 5,629,780 | 5/1997 | Watson | 358/432 |
| 5,701,369 | 12/1997 | Moon et al. | 382/249 |

*Primary Examiner*—Kim Yen Vu
*Assistant Examiner*—Cheukfan Lee
*Attorney, Agent, or Firm*—Robert E. Bushnell, Esq.

[57] ABSTRACT

The fractal image compression device of the present invention contemplates a control unit for dividing a composite image into a plurality of range blocks and a plurality of domain blocks, classifying the range blocks and domain blocks into several classes according to their respective attributes, and controlling an overall operation of the device. A page memory stores image data received from an external source, and provides output of the image data via control of the control unit. A domain block memory receives first pixel data within the domain blocks from the page memory, and stores the first pixel data via control of the control unit. A range block memory receives second pixel data within the range blocks from the page memory, and stores the second pixel data via control of the control unit. A slope and offset detecting unit spacially-transforms the first pixel data within the domain blocks to correspond one-to-one with corresponding second pixel data within the range blocks, calculates slope and offset values of contractive compression functions corresponding to the spacially-transformed domain blocks and the range blocks, calculates background sensitivities and edge sensitivities from the second pixel data within the range blocks, and calculates and provides output of distortion errors by multiplying brightness differences between corresponding pixels within the spacially-transformed domain blocks and the range blocks by the background sensitivities and the edge sensitivities. An image compression memory stores, as compression data, locations and the slope and offset values corresponding to ones of the domain blocks having minimum distortion errors, via control of the control unit.

26 Claims, 4 Drawing Sheets

FRACTAL IMAGE COMPRESSION DEVICE AND METHOD USING PERCEPTUAL DISTORTION MEASUREMENT

CROSS-REFERENCE TO RELATED APPLICATIONS

This application makes reference to, incorporates the same herein, and claims all benefits accruing under 35 U.S.C. §119 arising from an application for Fractal Image Compression Device And Method Using Perceptual Distortion Measurement earlier filed in the Korean Industrial Property Office on 13 Apr. 1995 and there duly assigned Ser. No. 8690/1995.

BACKGROUND OF THE INVENTION

The present invention relates to an image compression device and method, and more particularly, to a fractal image compression device and method using a contractive transformation function.

Digital image compression methods can be generally classified into transformation coding methods and vector quantization methods. With transformation coding methods (e.g., Joint Photographers Expert Group (JPEG) standard), image data is transformed into another domain, and compressed in the transformed domain. With vector quantization methods, a portion of image data is compared with images of a predetermined code book, and an index of the most similar code book image is then transmitted, thereby having a compression effect on the image data. Fractal image compression methods, as compared to the existing compression methods, approximate large quantities of digital image data by using a simple mathematical model, thereby having a compression effect on the image data.

With fractal image compression theory, one assumes that the image to be compressed is a fractal image having the property of self-similarity as the spatial scale is changed over several orders of magnitude. The property of self-similarity can be seen with, for example, a rocky, jagged coastline which looks similar when seen from a jet airplane (a distance of 10 km), from a low altitude plane (100 m) and from a standing position (1 m). Accordingly, for purposes of image processing, a contractive transformation function using the fractal image as an attractor can be obtained, thus compressing the image. It is very difficult, however, to obtain the contractive transformation function using the entire image to be compressed as the attractor. To resolve this problem with the fractal image compression method, the entire image is divided into a plurality of non-overlapping range blocks, and further divided into a plurality of domain blocks each having a size that is an integer (e.g., four) times larger than the size of each of the range blocks. The contractive transformation function for each one of the divided range blocks is obtained by contractively transforming the domain blocks into each of the range blocks, and calculating the errors between the contractively-transformed domain blocks and each of the range blocks. The domain block having a minimum error value for each range block is referred to as a matching domain block.

Jacquin's method is typically known as the most representative fractal image compression method based upon the method described above. In order to reduce the compression period, Jacquin's method classifies range blocks and domain blocks into several classes according to their attributes, and then, only the domain blocks belonging to the same class as a corresponding range block to be compressed are evaluated.

The fractal image compression method, which is theoretically capable of a very high-level of compression (i.e., $\frac{1}{10,000}$), is an unsymmetrical process having a much shorter recovery period than compression period. Therefore, there is an advantage in that the fractal image compression method is useful in applications where high-speed image recovery is required.

Currently, an iterated function system (IFS) proposed by Barnsley et al. is being utilized as a fractal image compression device and method. This system is disclosed in detail in U.S. Pat. No. 5,347,600 entitled Method And Apparatus For Compression And Decompression Of Digital Image Data. The distortion measurement, which is used as a reference for determining the self-similarity characteristic between blocks in conventional fractal image compression devices and methods, is generally a mean square error (MSE). That is, the domain block having the minimum mean square error for a corresponding range block is determined to be the domain block having the best self-similarity characteristics. With many improved techniques for fractal image compression, the mean square error has been used for the distortion measurement between image blocks.

The similarity between image blocks and overall image quality, however, is ultimately determined by the perceptions of the human eye. In this context, use of the mean square error (MSE) has often presented problems in other image compression fields. Therefore, with conventional fractal image compression techniques, since the mean square error (MSE) does not always adequately reflect human visual properties, domain blocks that fail to provide "self-similarity" from a visual standpoint are often determined to be matching domain blocks. Accordingly, the quality of a recovered image may be numerically improved, but is visually deteriorated. Moreover, conventional fractal image compression techniques often provide a reduced compression rate due to unnecessary division of range blocks.

SUMMARY OF THE INVENTION

Accordingly, it is an object of the present invention to provide an improved fractal image compression device and method.

It is another object to provide a fractal image compression device and method capable of reducing an unnecessary division of range blocks.

It is still another object to provide a fractal image compression device and method for improving the quality of a recovered image by using a distortion measurement based upon human visual properties.

It is yet another object to provide a fractal image compression device and method that does not rely upon the conventionally used mean square error (MSE) value.

To achieve these and other objects, the present invention provides a fractal image compression device and method. The fractal image compression device of the present invention contemplates a control unit for dividing a composite image into a plurality of non-overlapping range blocks and a plurality of domain blocks, classifying the range blocks and domain blocks into several classes according to their respective attributes, and controlling an overall operation of the device. A page memory stores image data received from an external source, and provides output of the image data via control of the control unit. A domain block memory receives first pixel data within the domain blocks from the page memory, and stores the first pixel data via control of the control unit. A range block memory receives second pixel data within the range blocks from the page memory, and stores the second pixel data via control of the control unit.

A slope and offset detecting unit spacially-transforms the first pixel data within the domain blocks to correspond one-to-one with corresponding second pixel data within the range blocks, calculates slope and offset values of contractive compression functions corresponding to the spacially-transformed domain blocks and the range blocks, calculates background sensitivities and edge sensitivities from the second pixel data within the range blocks, and calculates and provides output of distortion errors by multiplying brightness differences between corresponding pixels within the spacially-transformed domain blocks and the range blocks by the background sensitivities and the edge sensitivities. An image compression memory stores, as compression data, locations and the slope and offset values corresponding to ones of the domain blocks having minimum distortion errors, via control of the control unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
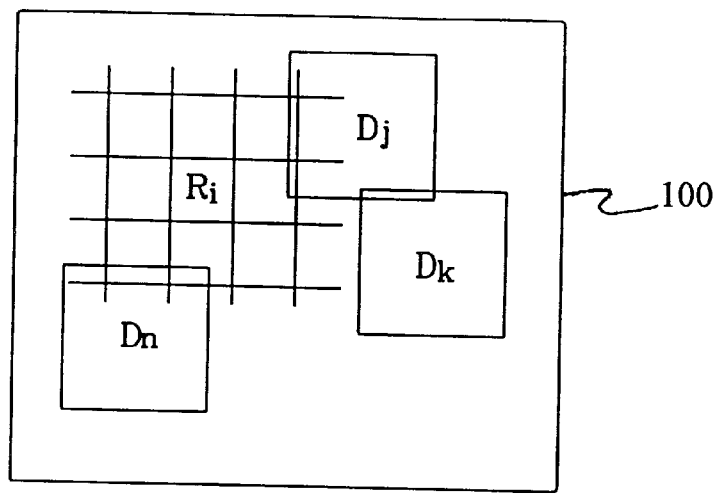
FIG. 1 is a diagram illustrating the designation range blocks and domain blocks according to a general fractal image compression method.

Turning now to the drawings and referring to FIG. 1, a diagram illustrating the designation of range blocks and domain blocks according to a general fractal image compression method is shown. In FIG. 1, a composite image 100 is divided into a plurality of non-overlapping range blocks generally indicated as $R_i$, and is further divided into a plurality of larger domain blocks generally indicated as $D_j$, $D_k$ and $D_n$. According to a general fractal image compression method, all of the domain blocks in composite image 100 are evaluated for similarity with each range block. To assess these similarities, each domain block is first reduced in size so that it is scaled into the applicable range block. The scaled domain block is then spacially transformed, thus obtaining coefficients of the contractive transformation function. Then, transformation function coefficients, mode of contractive transformation, and the location of the domain block having the highest degree of similarity with the corresponding range block are stored as a fractal code. These processes are repeated for all of the range blocks in composite image 100 so that a contractive transformation of composite image 100 is obtained.

Figure 2:
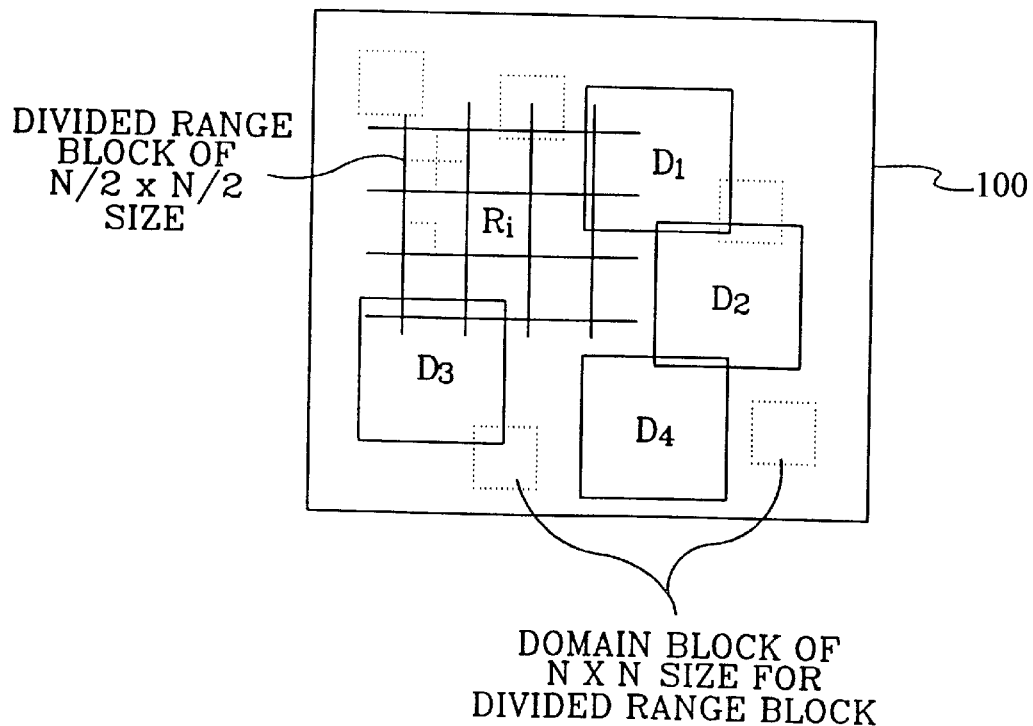
FIG. 2 is a diagram illustrating the designation of range blocks and domain blocks according to a contemporary fractal image compression method.

Referring now to FIG. 2, a diagram illustrating the designation of range blocks and domain blocks according to a contemporary fractal image compression method is shown. In FIG. 2, when only the domain blocks D1 and D3 among domain blocks D1–D4 belong to the same class as a range block Ri, the processing procedure for domain blocks D2 and D4 is not performed. For a more accurate approximation of the range block (i.e., in case the error between the range block and the domain block is large), the range block is further divided, and the same procedure can be performed for the divided range blocks.

With reference to FIG. 2, Jacquin's method is explained as follows. First, the composite image 100 is divided into non-overlapping range blocks (N×N), and further divided into domain blocks (2N×2N). Then, the contractive transformation is performed only for the domain blocks belonging to the same class as the corresponding range block to be compressed, thus evaluating a mean square error (MSE) between the range block and each of the applicable domain blocks. Then, the matching domain block having the minimum mean square error (MSE) value is obtained, and parameters of the contractive transformation function and a location of the matching domain block are stored as compression data. If the minimum mean square error (MSE) value is larger than a threshold value, the range block is further divided, and the same procedure is performed for each of the divided range blocks (N/2×N/2) using divided domain blocks (N×N). These divided range and domain blocks are generally indicated by the dotted lines shown in FIG. 2. After compression and transmission, the original composite image is recovered by a repeated application of the contractive transformation function that is obtained by an arbitrary initial image compression process based upon the fixed point theory of the contractive transformation. A detailed explanation of this well-known method will be avoided in the detailed description of the present invention.

The human visual system (HVS) is a field for analyzing and modeling an information processing method based on how a human being visually senses an image. Noise sensitivity factors recognized by the human visual system (HVS) include: background sensitivity, edge sensitivity, band sensitivity and texture masking, etc. The noise sensitivity factors contemplated in the practice of a preferred embodiment of the present invention, in order to perform the perceptual distortion measurement, include background sensitivity and edge sensitivity. Generally, if a background is bright or dark, noise sensitivity is reduced. An experimental graph illustrating the relationship between background brightness and human eye sensitivity is a two-dimensional curve. Also, if the brightness in the vicinity of an edge is increased, or the human eye is not focused on the edge, noise sensitivity is reduced. Measurement of the distortion error E according to the present invention is based upon two sensitivity characteristics, and is performed by multiplying existing error values by weighting values based on these characteristics, as shown in the following equation (1):

$$E = \frac{1}{N} \sqrt{\sum_{i=0}^{N-1} \sum_{j=0}^{N-1} (r_{ij} - \tau(D)_{ij})^2 \times W_{ij}} \tag{1}$$

where $W_{ij} = W_{eij}$ when Ri is in an edge class, and $W_{ij} = W_{bij}$, otherwise.

In equation (1), $(r_{ij} - \tau(D)_{ij})$ represents a brightness difference (i.e., error) between the range block and the contractively transformed domain block at the (i,j) pixel, and N represents a linear dimension of the range block. When the range block is not classified in the edge class, $W_{bij}$ is used as the weighting value based on the background sensitivity characteristic of the (i,j) pixel, and when the range block is in the edge class, $W_{eij}$ is used as the weighting value based on the edge sensitivity characteristic of the (i,j) pixel.

Calculation of the Background Sensitivity Weighting Value $W_{bij}$

The background sensitivity weighting value $W_{bij}$ of the (i,j) pixel is determined by evaluating a mean brightness value of pixels adjacent to the (i,j) pixel, to thereby apply the evaluated mean value to the two-dimensional curve function. Here, the experimental graph of the two-dimensional curve shows a maximum value in the vicinity of 127, and a minimum value at approximately 0 and 255.

Figure 3:
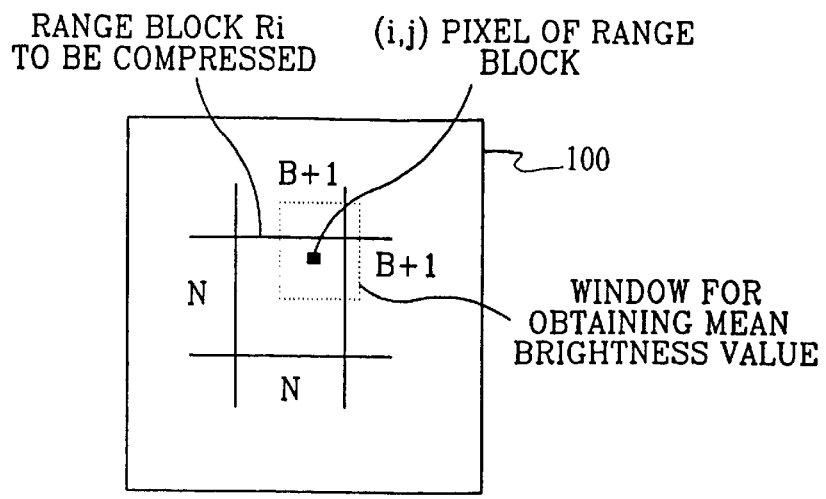
FIG. 3 is a block diagram illustrating an image for calculating noise sensitivity according to the principles of the present invention.

With reference to FIG. 3, which is a block diagram illustrating an image for calculating noise sensitivity, the two-dimensional curve used in the preferred embodiment of the present invention is represented by the following equations (2) and (3):

$$m_{ij} = \frac{1}{(B+1)^2} \sum_{k=i-\frac{B}{2}}^{i+\frac{B}{2}} \sum_{l=j-\frac{B}{2}}^{j+\frac{B}{2}} \times r_{kl} \quad (2)$$

$$W_{bij} = -a \times (m_{ij} - 127)^2 + b \quad (3)$$

where $r_{kl}$ represents a brightness value for a pixel (k,l) within a window $(B+1)^2$, and a, b and B are constants.

Calculation of the Edge Sensitivity Weighting Value $W_{eij}$

The edge sensitivity weighting value $W_{eij}$ of the (i,j) pixel is approximated to a linear function by calculating a mean difference value from different brightness values of pixels adjacent to the (i,j) pixel, and applying this mean difference value to the following equations (4) and (5).

$$Wei = k^{-x}, \{1.0 < k \leq 1.5\}$$

$$M_{ij} = \sum_{k=i-\frac{B}{2}}^{k=i+\frac{B}{2}} \sum_{l=j-\frac{B}{2}}^{l=j+\frac{B}{2}} 0.35^{\|(k,l)-(i,j)\|} \times \frac{|m_{kl}^H| + |m_{kl}^V|}{2},$$

$$m_{kl}^H = r_{k,l} - r_{k-1,l} \;]$$

$$m_{kl}^V = r_{k,l} - r_{k,l-1} \;] \quad (4)$$

$$W_{eij} = a \times M_{ij} \times \exp(-\lambda \times M_{ij}) \quad (5)$$

In the equations (4) and (5), $\|(k,l)-(i,j)\|$ is a distance between the (k,l) pixel and the (i,j) pixel, $r_{kl}$ is a brightness value of the (k,l) pixel within the range block, and a, B and $\lambda$ are constants.

On the other hand, the division method of each range block, the number of domain blocks for performing the contractive transformation, and the method of obtaining the parameter of the contractive transformation function, etc, are important elements influencing compression speed. The subject matter of the present invention, however, is directed towards improving the distortion measurement between the range block and the contractively transformed domain block, regardless of the aforementioned elements. Therefore, the fractal image compression method in accordance with the present invention does not cause a problem with respect to convergence of the image upon recovery.

Hereinafter, the configuration and operation of a preferred embodiment of the present invention will be described in detail with reference to the attached figures. In the following description, numerous specific details, are set forth in order to provide a thorough understanding of the present invention. It will be understood by those skilled in the art, however, that other embodiments of the present invention may be practiced without these specific details. Furthermore, a detailed explanation of items capable of obscuring the subject matter of the present invention will not be described.

Figure 4:
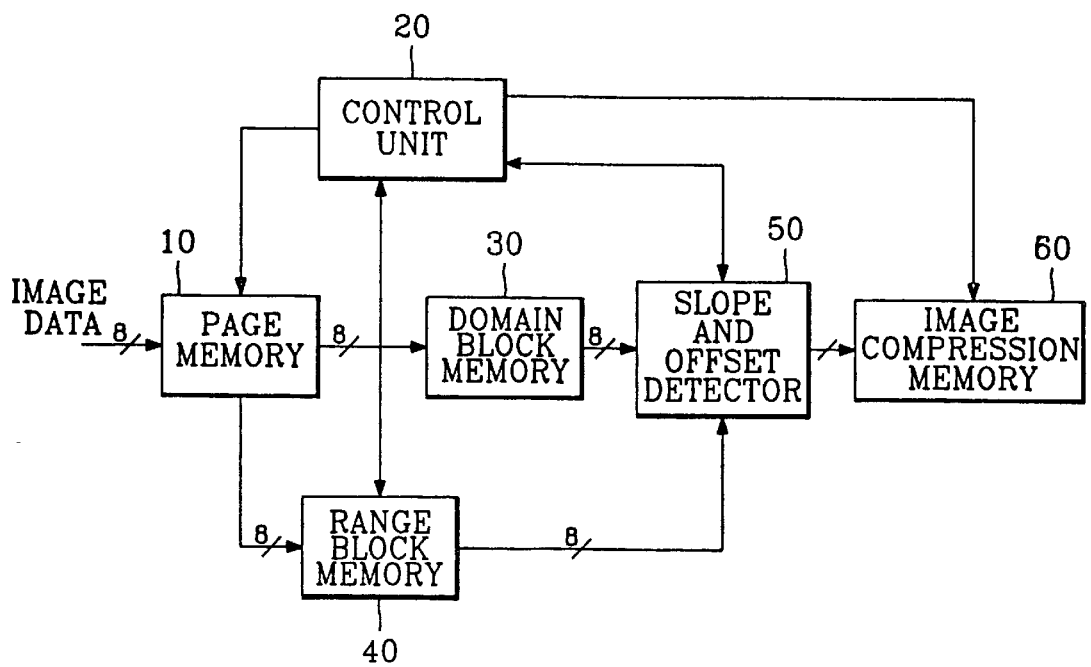
FIG. 4 is a block diagram illustrating a fractal image compression device using a perceptual distortion measurement according to the principles of the present invention.

FIG. 4 is a block diagram illustrating a fractal compression device using a perceptual distortion measurement according to the principles of the present invention. The fractal image compression device of FIG. 4 comprises: a page memory 10, a control unit 20, a domain block memory 30, a range block memory 40, a slope and offset detector 50 and an image compression memory 60. In FIG. 4, control unit 20 divides a composite image into a plurality of range blocks and a plurality of domain blocks, classifies the range blocks and the domain blocks into several classes according to their attributes, and controls the overall operation of the fractal image compression device. Page memory 10 stores externally provided image data, and provides output of stored image data under the control of control unit 20. Domain block memory 30 receives pixel data from a domain block of a predetermined size from page memory 10, and stores the data under the control of control unit 20 in order to search for the domain block having the highest degree of similarity to each range block. Range block memory 40 receives and stores pixel data representative of the portions of the composite image within the range blocks, which is obtained by dividing the composite image data received from page memory 10 by a given range block unit under the control of control unit 20. Slope and offset detector 50 spacially transforms pixel data within the domain blocks so as to correspond one-to-one with pixel data within the range blocks, calculates the slope and the offset values of the contractive transformation function applying the minimum square law in the spacially-transformed domain block and the range block, obtains the background sensitivity or the edge sensitivity from pixel data within the range blocks, and calculates the distortion error by multiplying the error of each corresponding pixel within the contractively-transformed domain block and the range block by the background sensitivity or the edge sensitivity. Image compression memory 60 stores the location of the domain block having the minimum distortion error for the range block, and the slope and offset values of the contractive transformation as compression data corresponding to inherent information of the corresponding range block, under the control of control unit 20. According to a preferred embodiment of the present invention, control unit 20 and slope and offset detector 50 can be embodied with a single microprocessor.

Figure 5A:
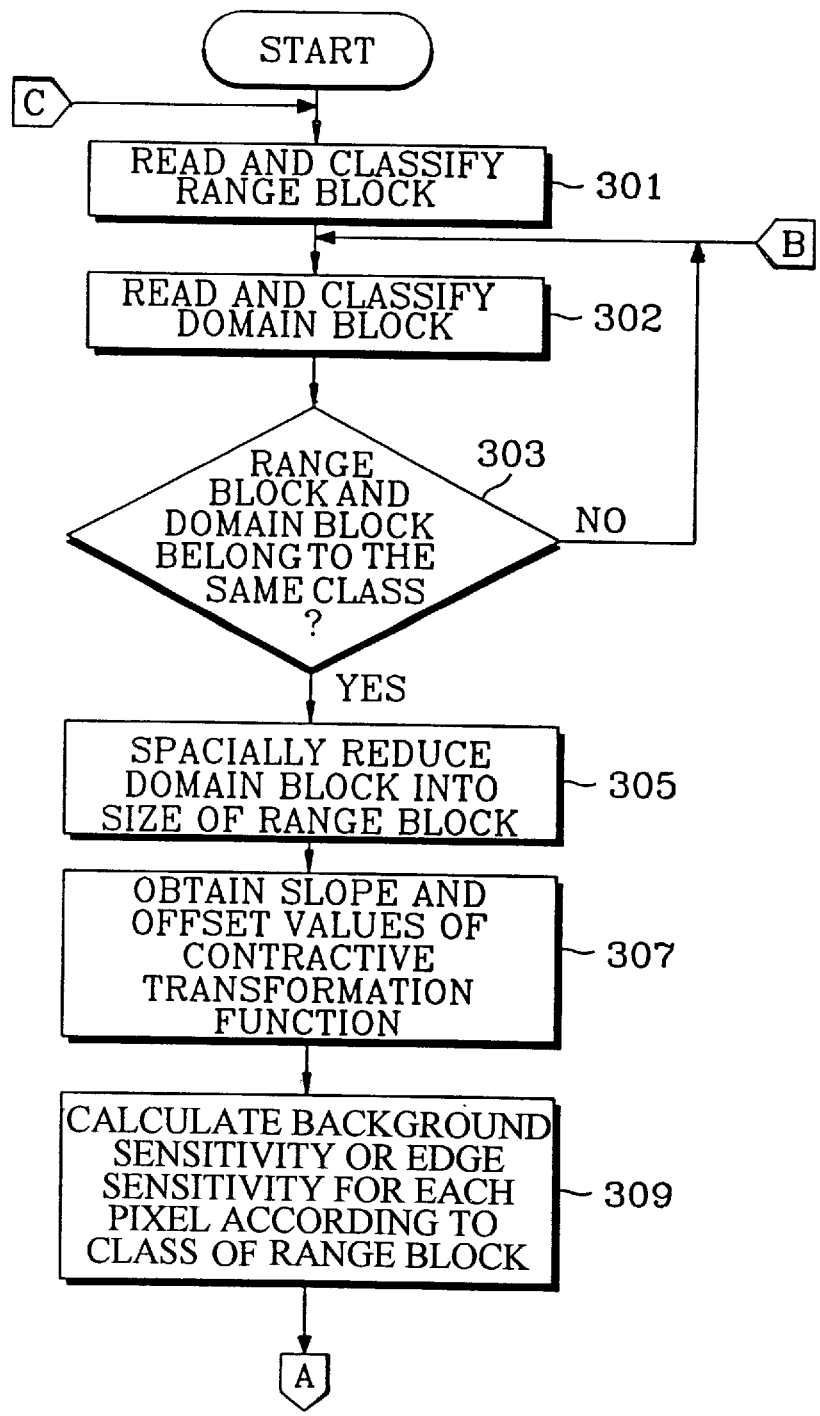
FIGS. 5A and 5B are flow charts illustrating the fractal image compression method using the perceptual distortion measurement according to the principles of the present invention.
Figure 5B:
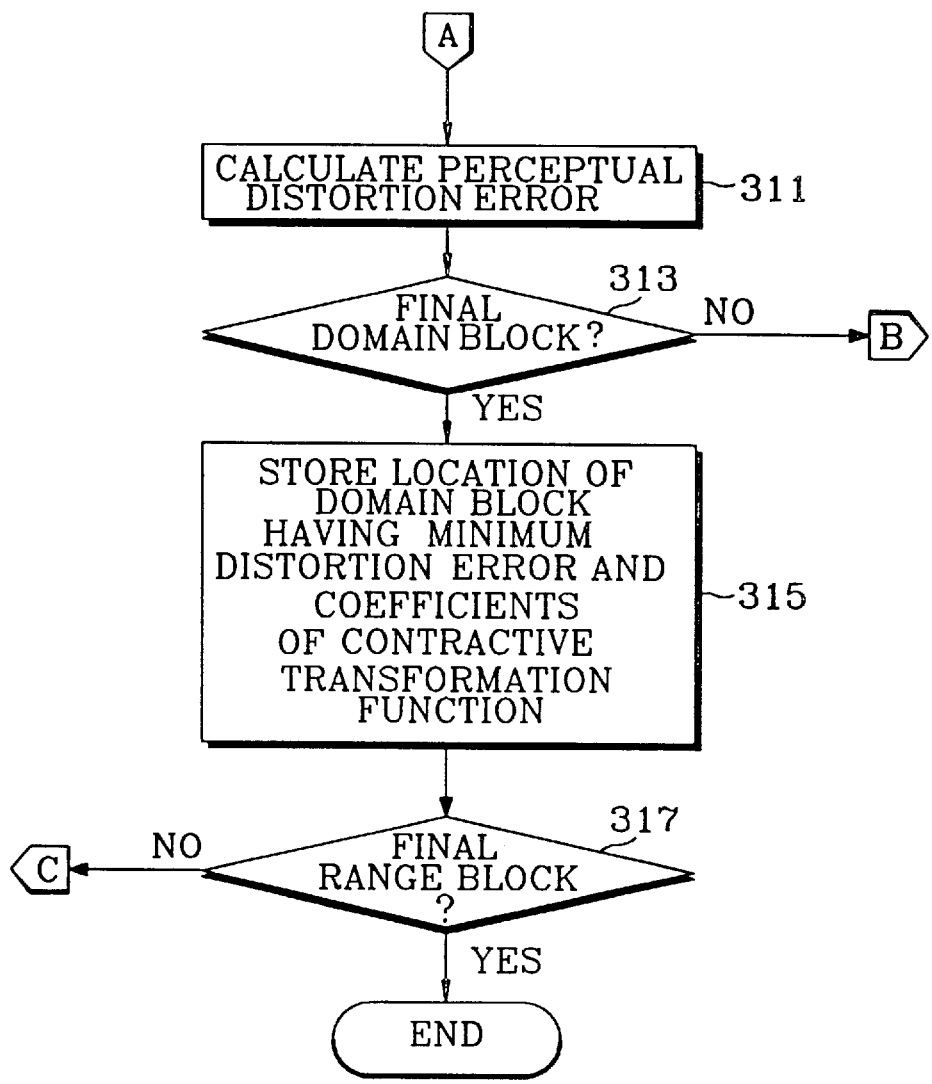

FIGS. 5A and 5B are flow charts illustrating the fractal image compression method using the perceptual distortion measurement according to the principles of the present invention. With reference to FIGS. 4 and 5, a preferred embodiment of the present invention will now be described in detail.

In step 301, control unit 20 accesses page memory 10 to store pixel data of a range block having a first predetermined size (N×N) in range block memory 40, and classifies the range block into one of several classes according to its attributes. In step 302, control unit 20 accesses page memory 10 to store pixel data of a domain block having a second predetermined size (2N×2N) in domain block memory 30, and classifies the domain block into one of several classes according to its attributes. In step 303, control unit 20 checks whether or not the range block and the domain block belong to the same class. If they do not belong to the same class, control unit 20 returns to step 302. Alternatively, if they do belong to the same class, control unit 20 proceeds to step 305. In step 305, control unit 20 accesses domain block memory 30, to thereby spacially transform pixel data within the domain block at a quarter space reduction rate. That is, the domain block is spacially reduced into the size of the range block. In step 307, control unit 20 obtains the slope and offset values of the contractive transformation function by applying the minimum square law to the spacially contracted domain block and the range block. Then, in step 309, the background sensitivity $W_{bij}$ or the edge sensitivity $W_{eij}$ is calculated for each pixel according to the class of the range block using equations (2) through (5). Thereafter, in step 311, the distortion error is determined according to equation (1). In step 313, control unit 20 determines whether the domain block processed in steps 303 to 311 is the final domain block. At this time, if the instant domain block is not the final domain block, control unit 20 returns to step 302 to thereby load the pixel data of a next domain block into domain block memory 30 and classify the next domain block, and then repeats steps 303 to 313. Alternatively, if the instant domain block is the final domain block, control unit 20 stores the slope and offset values of the contractive transformation function for the domain block having a minimum distortion error and the location of the domain block, together with inherent information of the corresponding range block, in compression image memory 60, in step 315. Control unit 20 then determines, in step 317, whether the corresponding range block processed in steps 301 through 315 is the final range block. At this time, if the instant range block is not the final range block, control unit 20 returns to step 301 to thereby load the pixel data of a next range block into range block memory 40 and classify the range block, and then repeats the previously described steps.

In the description of the present invention above, it is assumed that control unit 20 stores the slope and offset values of the contractive transformation function for the domain block having a minimum distortion error and the location of the domain block, in step 315, irrespective of how large the minimum distortion error is. According to another preferred embodiment of the present invention, however, control unit 20 compares the minimum distortion error with a threshold value, and stores the data associated with the matching domain block only when the minimum distortion error is less than the threshold value. If the minimum distortion error is greater than or equal to the threshold value, the corresponding range block is further divided into a predetermined number (e.g., four in a preferred embodiment) of equal portions (i.e., sub-range blocks), and the above described steps are repeated for each of the equal portions.

When an image is expressed in 8-bit resolution, the slope and offset values can be arbitrarily determined. In the present invention, however, the slope value is represented as six bits, and the offset value is represented as ten bits. These values are accordingly stored in image compression memory 60. Furthermore, the recovery of an image compressed through the process described above can be performed by the well-known fractal image recovery method.

In the present invention described above, weighting values using noise sensitivity factors of the human visual system (HVS) are included for enhancing human visual properties. Accordingly, visually important portions of an image are emphasized in processing. That is, the human visual properties are emphasized in determining the similarity between domain and range blocks. As a result, the quality of a recovered image is improved.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A fractal image compression method, comprising the steps of:

dividing a composite image into a plurality of range blocks and a plurality of domain blocks;

classifying said plurality of range blocks and said plurality of domain blocks into several classes according to their respective attributes;

identifying, for each one of said plurality of range blocks, one of said plurality of domain blocks having a minimum distortion error and coefficients of a contractive transformation function corresponding to said domain block having said minimum distortion error by performing, for each said one of said plurality of range blocks, sub-steps of:

spacially-reducing each one of said plurality of domain blocks belonging to a same class as a corresponding one of said plurality of range blocks into a size of said corresponding range block;

calculating, for each said one of said plurality of domain blocks belonging to said same class as said corresponding range block, said coefficients of said contractive transformation function corresponding to said spacially-reduced domain block from said spacially-reduced domain block and said corresponding range block;

calculating a noise sensitivity for each pixel of said corresponding range block to generate a plurality of noise sensitivities; and calculating, for each said one of said plurality of domain blocks belonging to said same class as said corresponding range block, a distortion error using said corresponding range block, said spacially-reduced domain block and said plurality of noise sensitivities;

storing, for each said one of said plurality of range blocks, a location and said coefficients of said contractive transformation function corresponding to said domain block having said minimum distortion error, when said minimum distortion error value is less than a threshold value; and dividing said corresponding range block into four sub-range blocks, and performing said sub-steps for each one of said sub-range blocks, when said minimum distortion error value is greater than or equal to said threshold value.

2. The method as claimed in claim 1, wherein said noise sensitivity calculated for each said pixel of said corresponding range block corresponds to one of a background sensitivity and an edge sensitivity.

3. The method as claimed in claim 2, wherein said distortion error is represented as E in a following expression:

$$E = \frac{1}{N} \sqrt{\sum_{i=0}^{N-1} \sum_{j=0}^{N-1} (r_{ij} - \tau(D)_{ij})^2 \times W_{ij}}$$

wherein, $(r_{ij}-\tau(D)_{ij})$ represents a brightness difference between said corresponding range block and said spacially reduced domain block at an (i,j) pixel, N represents a linear dimension of said corresponding range block, $W_{ij}=W_{eij}$ when said corresponding range block belongs to an edge class, and $W_{ij}=W_{bij}$ otherwise, said noise sensitivity being represented as $W_{ij}$, said background sensitivity being represented as $W_{bij}$, and said edge sensitivity being represented as $W_{eij}$.

4. The method as claimed in claim 3, wherein said background sensitivity is determined by a following expression:

$$W_{bij} = -a \times (m_{ij}-127)^2 + b,$$

wherein $$m_{ij} = \frac{1}{(B+1)^2} \sum_{k=i-\frac{B}{2}}^{k=i+\frac{B}{2}} \sum_{l=j-\frac{B}{2}}^{k=j+\frac{B}{2}} \times r_{kl},$$

$r_{kl}$ is a brightness value of a (k,l) pixel within a window $(B+1)^2$, and a, b and B are constants.

5. The method as claimed in claim 4, wherein said edge sensitivity is determined by a following expression:

$$W_{eij} = a \times M_{ij} exp(-\lambda \times M_{ij}),$$

wherein $$M_{ij} = \sum_{k=i-\frac{B}{2}}^{k=i+\frac{B}{2}} \sum_{l=j-\frac{B}{2}}^{l=j+\frac{B}{2}} 0.35^{\|(k,l)-(i,j)\|} \times \frac{(|m_{kl}^H| + |m_{kl}^V|)}{2},$$

$m_{kl}^H = r_{k,l} - r_{k-1,l}$, $m_{kl}^V = r_{k,l} - r_{k,l-1}$, $r_{kl}$ is a brightness value of said (k,l) pixel, and a, B and $\lambda$ are constants.

6. The method as claimed in claim 3, wherein said edge sensitivity is determined by a following expression:

$$W_{eij} = a \times M_{ij} exp(-\lambda \times M_{ij}),$$

wherein $$M_{ij} = \sum_{k=i-\frac{B}{2}}^{k=i+\frac{B}{2}} \sum_{l=j-\frac{B}{2}}^{l=j+\frac{B}{2}} 0.35^{\|(k,l)-(i,j)\|} \times \frac{(|m_{kl}^H| + |m_{kl}^V|)}{2},$$

$m_{kl}^H = r_{k,l} - r_{k-1,l}$, $m_{kl}^V = r_{k,l} - r_{k,l-1}$, $r_{kl}$ is a brightness value of a (k,l) pixel, and a, B and $\lambda$ are constants.

7. The method as claimed in claim 6, wherein said edge sensitivity is approximated to a linear function.

8. The method as claimed in claim 2, wherein said background sensitivity is represented as $W_{bij}$ in a following expression:

$$W_{bij} = -a \times (m_{ij}-127)^2 + b,$$

wherein $$m_{ij} = \frac{1}{(B+1)^2} \sum_{k=i-\frac{B}{2}}^{k=i+\frac{B}{2}} \sum_{l=j-\frac{B}{2}}^{k=j+\frac{B}{2}} \times r_{kl},$$

$r_{kl}$ is a brightness value of a (k,l) pixel within a window $(B+1)^2$, and a, b and B are constants.

9. The method as claimed in claim 2, wherein said edge sensitivity is represented as $W_{eij}$ in a following expression:

$$W_{eij} = a \times M_{ij} exp(-\lambda \times M_{ij}),$$

wherein $$M_{ij} = \sum_{k=i-\frac{B}{2}}^{k=i+\frac{B}{2}} \sum_{l=j-\frac{B}{2}}^{l=j+\frac{B}{2}} 0.35^{\|(k,l)-(i,j)\|} \times \frac{(|m_{kl}^H| + |m_{kl}^V|)}{2},$$

$m_{kl}^H = r_{k,l} - r_{k-1,l}$, $m_{kl}^V = r_{k,l} - r_{k,l-1}$, $r_{kl}$ is a brightness value of a (k,l) pixel, and a, B and $\lambda$ are constants.

10. The method as claimed in claim 9, wherein said edge sensitivity is approximated to a linear function.

11. A fractal image compression device, comprising:

a control unit for dividing a composite image into a plurality of range blocks and a plurality of domain blocks, classifying said range blocks and said domain blocks into several classes according to their respective attributes, and controlling an overall operation of said device;

a first storing unit for storing image data received from an external source, and providing output of said image data via control of said control unit;

a domain block storing unit for receiving first pixel data within said domain blocks from said first storing unit, and storing said first pixel data via control of said control unit;

a range block storing unit for receiving second pixel data within said range blocks from said first storing unit, and storing said second pixel data via control of said control unit;

a slope and offset detecting unit for spacially-transforming said first pixel data within said domain blocks to correspond one-to-one with corresponding said second pixel data within said range blocks, calculating slope and offset values of contractive compression functions corresponding to the spacially-transformed domain blocks and said range blocks, calculating background sensitivities and edge sensitivities from said second pixel data within said range blocks, and calculating and providing output of distortion errors by multiplying brightness differences between corresponding pixels within said spacially-transformed domain blocks and said range blocks by said background sensitivities and said edge sensitivities; and a second storing unit for storing as compression data, locations and said slope and offset values corresponding to ones of said domain blocks having minimum distortion errors, via control of said control unit.

12. The device as claimed in claim 11, wherein said control unit and said slope and offset detecting unit comprise one microprocessor.

13. The device as claimed in claim 11, wherein each of said domain blocks exhibits a first predetermined size, and each of said range blocks exhibits a second predetermined size.

14. A fractal image compression method, comprising the steps of:
  dividing a composite image into a plurality of domain blocks and a plurality of non-overlapping range blocks;
  generating compression data by performing, for each one of said range blocks, sub-steps of:
    spacially-reducing each one of said domain blocks assigned to a corresponding one of said range blocks into a size of said corresponding range block;
    calculating, for each said one of said domain blocks assigned to said corresponding range block, coefficients of a contractive transformation function corresponding to said spacially-reduced domain block from said spacially-reduced domain block and said corresponding range block;
    calculating a noise sensitivity for each pixel of said corresponding range block to generate a plurality of noise sensitivities;
    calculating, for each said one of said domain blocks assigned to said corresponding range block, a distortion error using said corresponding range block, said spacially-reduced domain block and said plurality of noise sensitivities; and
    storing a location and said coefficients of said contractive transformation function corresponding to said domain block having a minimum distortion error, when said minimum distortion error value is less than a threshold value; and
  dividing said corresponding range block into four sub-range blocks, and performing said sub-steps for each one of said sub-range blocks, when said minimum distortion error value is greater than or equal to said threshold value.

15. The method as claimed in claim 14, wherein said noise sensitivity calculated for each said pixel of said corresponding range block corresponds to one of a background sensitivity and an edge sensitivity.

16. The method as claimed in claim 15, wherein said distortion error is represented as E in a following expression:

$$E = \frac{1}{N} \sqrt{\sum_{i=0}^{N-1} \sum_{j=0}^{N-1} (r_{ij} - \tau(D)_{ij})^2 \times W_{ij}}$$

wherein, $(r_{ij} - \tau(D)_{ij})$ represents a brightness difference between said corresponding range block and said spatially reduced domain block at an (i,j) pixel, N represents a linear dimension of said corresponding range block, $W_{ij} = W_{eij}$ when said corresponding range block belongs to an edge class, and $W_{ij} = W_{bij}$ otherwise, said noise sensitivity being represented as $W_{ij}$, said background sensitivity being represented as $W_{bij}$, and said edge sensitivity being represented as $W_{eij}$.

17. The method as claimed in claim 16, wherein said background sensitivity is represented as $W_{bij}$ in a following expression:

$$W_{bij} = -a \times (m_{ij} - 127)^2 + b,$$

wherein $$m_{ij} = \frac{1}{(B+1)^2} \sum_{k=i-\frac{B}{2}}^{k=i+\frac{B}{2}} \sum_{l=j-\frac{B}{2}}^{l=j+\frac{B}{2}} \times r_{kl},$$

$r_{kl}$ is a brightness value of a (k,l) pixel within a window $(B+1)^2$, and a, b and B are constants.

18. The method as claimed in claim 17, wherein said edge sensitivity is represented as $W_{eij}$ in a following expression:

$$W_{eij} = a \times M_{ij} \exp(-\lambda \times M_{ij}),$$

wherein $$M_{ij} = \sum_{k=i-\frac{B}{2}}^{k=i+\frac{B}{2}} \sum_{l=j-\frac{B}{2}}^{l=j+\frac{B}{2}} 0.35^{\|(k,l)-(i,j)\|} \times \frac{(|m_{kl}^H| + |m_{kl}^V|)}{2},$$

$m_{kl}^H = r_{k,l} - r_{k-1,l}$, $m_{kl}^V = r_{k,l} - r_{k,l-1}$, $r_{kl}$ is a brightness value of a (k,l) pixel, and a, B and λ are constants.

19. The method as claimed in claim 18, wherein said edge sensitivity is approximated to a linear function.

20. The device as claimed in claim 15, wherein each of said domain blocks exhibits a first predetermined size, and each of said range blocks exhibits a second predetermined size.

21. A fractal image compression method, comprising the steps of:
  dividing a composite image into a plurality of domain blocks and a plurality of non-overlapping range blocks;
  reading and classifying a first one of said range blocks;
  reading and classifying a first one of said domain blocks;
  determining whether said first range block and said first domain block belong to a same class;
  spacially-reducing said first domain block into a size of said first range block, when said first range block and said first domain block belong to the same class;
  obtaining slope and offset values of a contractive transformation function from said spacially-reduced first domain block and said first range block;
  generating a plurality of noise sensitivities by calculating, for each pixel within said first range block, one of a background sensitivity and an edge sensitivity according to a classification of said first range block; and
  calculating a distortion error using said first range block, said spacially-reduced domain block, and said plurality of noise sensitivities.

22. The method as claimed in claim 21, wherein said edge sensitivity is calculated for each said pixel within said first range block when said first range block corresponds to an edge class, and said background sensitivity is calculated for each said pixel within said first range block when said first range block corresponds to a class other than said edge class.

23. The method as claimed in claim 21, further comprised of calculating said distortion error for each one of said domain blocks, identifying one of said domain blocks having a minimum distortion error, and storing a location and coefficients of said contractive transformation function corresponding to said one of said domain blocks having said minimum distortion error.

24. A fractal image compression device, comprising:
  a control unit for dividing a composite image into a plurality of range blocks and a plurality of domain blocks, classifying said range blocks and said domain blocks into several classes according to their respective attributes, and controlling an overall operation of said device; and a slope and offset detecting unit for spacially-transforming first pixel data within said domain blocks to correspond one-to-one with corresponding second pixel data within said range blocks, calculating slope and offset values of contractive compression functions corresponding to the spacially-transformed domain blocks and said range blocks, calculating background sensitivities and edge sensitivities from said second pixel data within said range blocks, and calculating and providing output of distortion errors by multiplying brightness differences between corresponding pixels within said spacially-transformed domain blocks and said range blocks by said background sensitivities and said edge sensitivities.

25. The device as claimed in claim 24, wherein said control unit and said slope and offset detecting unit comprise one microprocessor.

26. The device as claimed in claim 24, wherein each of said domain blocks exhibits a first predetermined size, and each of said range blocks exhibits a second predetermined size.

* * * * *